April 19, 1960  W. ALLISON  2,933,298
INTEGRATING ACCELEROMETER
Filed Nov. 16, 1953

*INVENTOR.*
WILLIAM ALLISON
BY P.E. Henninger

United States Patent Office 2,933,298
Patented Apr. 19, 1960

2,933,298

INTEGRATING ACCELEROMETER

William Allison, Huntington Station, N.Y., assignor to International Business Machines Corporation, New York, N.Y., a corporation of New York Application November 16, 1953, Serial No. 392,081

5 Claims. (Cl. 264—1)

This invention deals generally with an accelerometer, i.e. an instrument for measuring acceleration. More specifically, the invention is concerned with a particular type of accelerometer which is able to accomplish a continuous integration of acceleration forces and therefore is in the final analysis an accurate velocity meter. An accelerometer is, generally speaking, an instrument which measures accelerations and the usual type of accelometer employs a pendulum which is displaced by acceleration forces being measured. My invention employs a pendulum style of accelerometer, but goes farther than this, and by means to be described, I am able to make a continuous integration of the accelerations applied to the pendulum of my device. In this way I am able to produce a very sensitive and extremely accurate measure of the velocity of any vehicle or body to which my device is attached. The velocity as measured by my device will be confined to a given line of direction, and therefore may be only a component of the velocity of a given body, unless the line of directions along which my device senses the accelerations is parallel to the direction of translation of the body.

My invention employs a pendulum which is mounted for free rotation about a given axis which axis is located at right angles to the direction of acceleration forces that are to be integrated. Connected to the pendulum in my device is a pick-off element which measures the displacement of the pendulum from zero or vertical at rest position. The other elements included in my device are a motor which is controlled by signals from the pick-off and means to produce a force that is proportional to the speed of the motor, which force is applied in such a direction as to return the pendulum to its zero or vertical position against the acceleration force acting on the pendulum. Finally my device makes use of a revolution counter which is connected to the motor so as to give an indication of the integral of the acceleration in a manner to be more fully explained below.

Consequently, it is one object of my invention to provide an accelerometer which may continuously integrate acceleration forces along a given line of directions so that both acceleration and deceleration of any given body to which the instrument is attached, as measured along a given line, may be integrated.

Another object of this invention is to provide an integrating accelerometer which will produce a very sensitive and accurate measure of velocity in a given direction.

Figure 1:
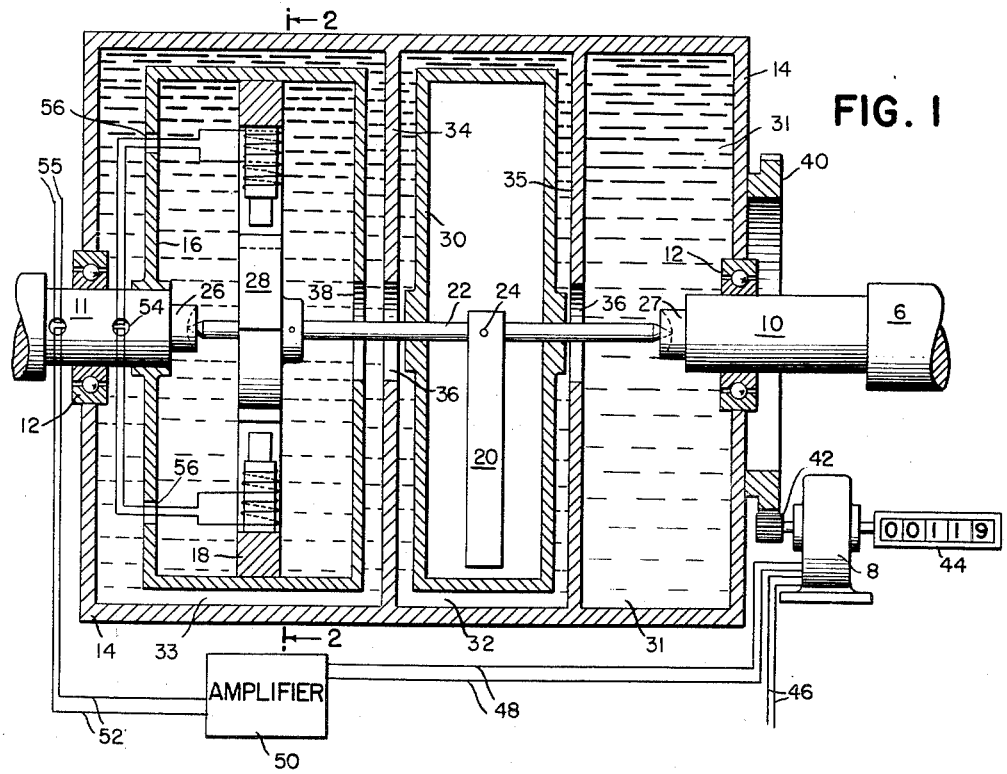
Figure 2:
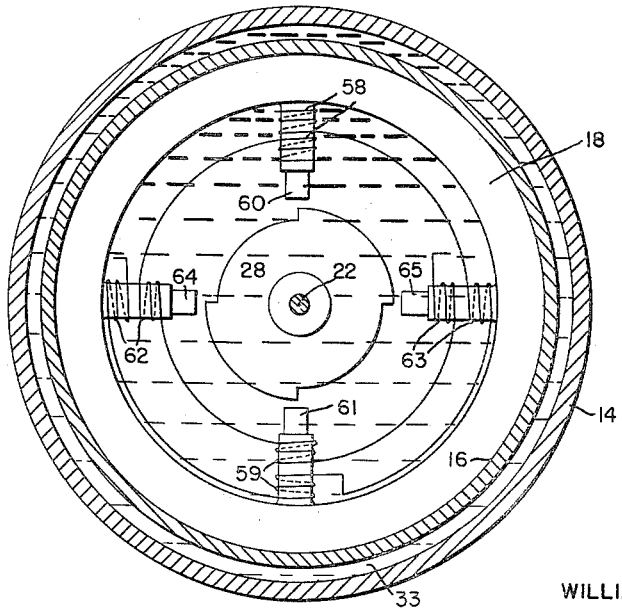

Figure 1 is a longitudinal cross-sectional view of the integrating accelerometer; and Fig. 2 is a transverse cross-sectional view taken along the line 2—2 of Fig. 1 showing details of the construction of the type of pick-off being used.

Referring to Fig. 1, it is to be noted that the device of my invention will be mounted upon a vehicle or any given body (not shown) of which the accelerations along a line that is perpendicular to the plane of the paper are to be integrated. This is assuming that the pendulum is hanging vertically as illustrated. There are two main supports 6 and a motor 8, that will be mounted in any convenient manner upon the vehicle or body (not shown) the velocity of which along a given line is to be measured. Integral with the supports 6 are a pair of stationary shafts 10 and 11 which carry a pair of bearings 12 for rotatably supporting a cylindrical casing 14. Securely attached to shaft 11 is an inner housing 16 which carries the stationary elements of an electrical pick-off device 18.

Carried in a freely rotatable manner but independently from the rotatable casing 14 is a pendulum 20 which is securely fastened for rotation with a shaft 22 to which the pendulum is fastened, as by a pin 24. Shaft 22 is carried by any suitable type of frictionless bearings such as a pair of needle point jewel bearings 26 and 27 illustrated. Securely attached to the same shaft 22 for rotation therewith is a rotor element 28 of the pick-off device 18. Also securely fastened to the shaft 22 for rotation integrally therewith, is a hollow disc-like housing 30 which surrounds the pendulum 20 and which has a tight connection with the shaft 22 so that no fluid may enter the empty space within this housing 30. There is a fluid entirely filling the inside of cylindrical casing 14 for purposes which will presently appear. This fluid fills each of three chambers 31, 32 and 33 that are formed on the inside of the casing 14. A pair of partitions 34 and 35 are located transversely inside of the casing 14 and separate the three chambers 31, 32 and 33. These partitions 34 and 35 are spaced closely to the outside flat surfaces of the housing 30 (for the pendulum 20). At the center of these partitions 34 and 35, there are located two holes 36 which allow free access for the fluid within the casing to flow completely around the pendulum housing 30. There is also a similar hole 38 which is located concentrically with shaft 22 as were the holes 36 and which hole 38 is in the inner housing 16 of the pick-off device.

It will be observed that the entire inner spaces of the cylindrical casing 14 are filled with fluid except for the separated inner space within the housing 30 (of the pendulum 20). It is not absolutely necessary to have fluid surrounding the elements of the pick-off device 18; however, some beneficial damping effects may be had on account of this fluid. Otherwise, the presence of fluid in either end chamber 31 or 33 acts merely as a reservoir or extra supply of fluid to keep the housing 30 of the pendulum completely surrounded by fluid at all times.

Attached securely in any appropriate manner to one end of the casing 14 is a gear 40 which has meshing therewith a pinion 42 that is driven by the motor 8. A revolution counter 44 is attached to the end of the shaft of motor 8 remote from pinion 42, or may be otherwise conveniently connected to the motor, for indicating the number of revolutions made by the motor when it turns in one direction or the other. This revolution counter 44 will be calibrated in terms of velocity for reasons that will presently appear. In this manner, the velocity of the vehicle or body in or parallel to a given line, which is at right angles to the axis of the pendulum 20 and likewise to the vertical, will be continuously measured and indicated by the revolution counter 44.

The electrical circuit for energizing the motor 8 is schematically illustrated, and includes a pair of wires 46 which will be energized from the line (or a suitable supply of constant phase and voltage, alternating current). The motor 8 may be any suitable type of electric motor, but in the circuit illustrated it is a 2-phase A.C. motor, one phase of which is energized from the line via wires 46 as just explained, and the other phase of which is energized via another pair of wires 48 which lead from the output of an amplifier 50 shown schematically by a box marked amplifier. The input to amplifier 50 is fed over another pair of wires 52 which are led into the pick-off device 18 by means of a passage 54 within the shaft 11. The pick-off device 18 is excited from the line, or from any suitable constant source of A.C. as in the case of the one winding of motor 8, by means of a pair of wires 55 which are led into the pick-off device 18 through the same passage 54. These lead wires 52 and 55 of the pick-off device 18 may be carried from the pick-off device within casing 14 to the outside thereof in any suitable manner. These wires have been schematically illustrated as being led through the passage 54 and then through a pair of holes 56 in the inner housing 16, and so to the stator windings on pick-off device 18.

The pick-off device 18 may be any convenient type of pick-off for producing a signal upon the displacement of pendulum 20 from vertical, however, I prefer to use a pick-off of the style illustrated. This is a known type of signal generator and sufficient details for a working understanding have been illustrated in Fig. 2 of the drawings. The operation of this pick-off may readily be understood with reference to Fig. 2. It will be observed that attached to the shaft 22 is the rotor element 28 which has a symmetrical shape as illustrated. This rotor element 28 is of magnetic material and acts to complete magnetic paths for the flux generated by a pair of windings 58, 59, 62, 63, located on each of four pole pieces 60, 61, 64 and 65. It will be observed that each pair of windings 58, 59, 62 and 63 is made up of two inductively coupled windings in each case, and one winding of each pair is connected in series with the corresponding winding on each of the poles 60, 61, 64 and 65. The operation of the pick-off is such that when zero or the vertical position of pendulum 20 exists, rotor element 28 is in the position illustrated in Fig. 2, i.e. no signal is generated in the output of the pick-off. However, when rotor element 28 is rotated with the pendulum 20 in one direction or the other, a signal of one phase or opposite phase will be generated in the output wires 52 and this signal will then be amplified in the amplifier 50, and fed to the motor 8 to cause the motor to run in one direction or the other depending upon the signal applied. It will be understood that this is accomplished by means of the windings 58, 59, 62 and 63 of the pick-off device. One winding of each pair of windings, will be excited from the line via wires 55, and the other winding of each pair will be so wound on its pole piece that diametrically opposite pairs of windings, e.g. the windings 58 and 59 will be in magnetic opposition while windings 62 and 63 will be magnetically aiding one another. In this manner, there will be in effect a bridge net work the output of which will be an A.C. signal of one phase or the opposite phase which varies in amplitude through zero. Turning the rotor 28 from the position illustrated in Fig. 2 causes the mutual coupling of one group of windings, e.g. windings 58, 59, to increase while the effect of the other group of windings 62, 63, will decrease, and in this manner a signal of one phase or the other will be generated, depending upon which pair of diametrically located pole pieces has its flux density increased and which decreased. By proper adjustment of the rotor element 28 a zero or minimum signal will be produced in wires 52 when the pendulum 20 is in a vertical position.

Operation

When the body or vehicle upon which the instrument is located is subject to any acceleration along a line parallel to the line that is perpendicular to the axis of rotation of pendulum 20, and also perpendicular to the vertical, the pendulum 20 will be displaced and will correspondingly rotate the disc like housing 30 which surrounds and acts integrally with the pendulum. This displacement will correspondingly rotate the rotor element 28 of the pick-off 18 and produce a signal of a given phase and amplitude depending upon the direction and amplitude of the acceleration along the line that is perpendicular to the axis of rotation of pendulum 20 and also perpendicular to the vertical. Such signal will be fed via the wires 52, to the amplifier 50. This signal will be amplified and then fed over the wires 48 to the control winding of motor 8 which will cause the motor 8 to rotate in a given direction at a speed proportional to the amplitude of the signal. This rotation of the motor 8 will drive the cylindrical casing 14 in rotation and thus will exert a frictional force on the housing 30 by reason of the fluid that surrounds this housing 30 in rather close proximity to the two partitions 34 and 35 as well as the outer wall of central chamber 32 of the casing 14. This frictional force will be in such a direction as to oppose or return the pendulum 20 to its vertical position. Now it will be evident that a balance will be reached such that the motor 8 will rotate at a speed that is proportional to the acceleration force acting upon pendulum 20. By employing a revolution counter such as the counter 44 the speed of motor 8 is constantly integrated and therefore the indication given by the counter 44 may be calibrated in terms of velocity, since velocity is the integral of acceleration of any given body. Consequently, it will be apparent that I have provided an integrating accelerometer which is capable of continuously indicating instantaneous velocities of a given body in a given line of direction, i.e., along a line perpendicular to the axis of a single axis pendulum and also perpendicular to its vertical.

While I have disclosed in detail a specific embodiment of my invention in accordance with the patent statutes, this is not to be taken as limiting in any way the scope of my invention but merely as being illustrative of a single embodiment thereof.

I claim:

1. An integrating accelerometer comprising pendulous means subject to acceleration forces in a predetermined line of directions, an electrical pick-off actuated by said pendulous means for producing a signal when said pendulous means is subject to acceleration forces in the predetermined line of directions, an electric motor controlled by said signal, fluid coupling means between said motor and said pendulous means for applying opposing forces to said acceleration forces, and indicator means connected to said motor for indicating instantaneous velocity of said accelerometer.

2. An integrating accelerometer comprising pendulous means subject to acceleration forces in a predetermined line of directions, an electrical pick-off actuated by said pendulous means for producing a signal of one phase or of opposite phase depending upon the direction of the acceleration force along said line, a reversible electric motor controlled by said signal, fluid coupling means for applying force to said pendulous means proportional to the velocity of said motor and in opposition to said acceleration force, and means for counting the revolutions of said motor so that the velocity of the motor will be integrated in order to determine the instantaneous velocity of the accelerometer continuously.

3. An integrating accelerometer comprising a pendulous device suspended for rotation about a given axis only, a pick-off connected to said pendulous device for generating a signal upon displacement of said pendulous device from the vertical, a motor controlled by said signal, fluid coupling means between said motor and said pendulous device for applying counter rotational force to said pendulous device tending to restore the same to the vertical, and a revolution counter device for counting the revolutions made by the motor shaft.

4. An integrating accelerometer comprising a pendulum suspended for rotation about a given axis only, a housing for said pendulum, said housing being symmetrical about said axis, a pick-off connected to said pendulum for generating a signal upon displacement of said pendulum, said signal having an amplitude proportional to said displacement and reversing in sense with a reversal of the displacement of the pendulum from the vertical, a motor controlled by said signal, said motor reversing upon a reversal in sense of said signal and running at a speed proportional to the amplitude of said signal, fluid coupling means between said housing and said motor for applying a counter torque to said pendulum tending to return it to the vertical, and a revolution counter connected to said motor for indicating the instantaneous velocity of the accelerometer in a given line of directions.

5. An integrating accelerometer comprising a pendulum suspended for rotation about a given axis only, a housing for said pendulum, said housing being symmetrical about said axis, a pick-off connected to said pendulum for generating a signal upon displacement of said pendulum, said signal having an amplitude proportional to said displacement and reversing in sense with a reversal of the displacement of the pendulum from the vertical, a casing surrounding said housing, a fluid located between said casing and said housing, a motor connected to said casing for rotating the same in a direction tending to restore the pendulum to the vertical, said motor running at a speed proportional to the amplitude of said signal and reversing with a reversal in sense of said signal, and a revolution counter connected to the shaft of said motor for indicating the instantaneous velocity of the accelerometer in a predetermined line of directions.

References Cited in the file of this patent

UNITED STATES PATENTS

| | | |
|---|---|---|
| 2,193,707 | Baumann | Mar. 12, 1940 |
| 2,338,147 | Von den Steinen | Jan. 4, 1944 |
| 2,484,022 | Esval | Oct. 11, 1949 |
| 2,577,061 | Woolston et al. | Dec. 4, 1951 |
| 2,622,865 | Sundt | Dec. 23, 1952 |